US006977608B1

(12) United States Patent
Anderson et al.

(10) Patent No.: US 6,977,608 B1
(45) Date of Patent: Dec. 20, 2005

(54) ATMOSPHERIC DATA AGGREGATION AND FORECASTING SYSTEM

(75) Inventors: Eric N. Anderson, Cedar Rapids, IA (US); Patrick D. McCusker, Center Point, IA (US)

(73) Assignee: Rockwell Collins, Cedar Rapids, IA (US)

( * ) Notice: Subject to any disclaimer, the term of this patent is extended or adjusted under 35 U.S.C. 154(b) by 0 days.

(21) Appl. No.: 11/014,431

(22) Filed: Dec. 15, 2004

(51) Int. Cl.$^7$ ............................................. G01S 13/95
(52) U.S. Cl. ..................... 342/26 B; 342/57; 342/58; 701/120; 702/3; 340/945; 340/963
(58) Field of Search ........................... 342/26 R, 26 A, 342/26 B, 26 C, 26 D, 29, 33, 36, 46, 50, 342/52, 57–60, 189, 195, 460; 701/3, 120; 702/3; 340/945, 961, 963, 968

(56) References Cited

U.S. PATENT DOCUMENTS

| | | | |
|---|---|---|---|
| 6,043,756 A | 3/2000 | Bateman | 340/945 |
| 6,181,260 B1 * | 1/2001 | Simon et al. | 340/949 |
| 6,201,494 B1 | 3/2001 | Kronfeld | 342/26 R |
| 6,212,132 B1 * | 4/2001 | Yamane et al. | 367/180 |
| 6,252,544 B1 * | 6/2001 | Hoffberg | 342/357.1 |
| 6,429,812 B1 * | 8/2002 | Hoffberg | 342/357.1 |
| 6,441,773 B1 | 8/2002 | Kelly et al. | 342/26 R |
| 6,501,392 B2 | 12/2002 | Gremmert | 340/971 |
| 6,577,947 B1 | 6/2003 | Kronfeld | 701/202 |
| 6,667,710 B2 | 12/2003 | Cornell | 342/26 R |
| 6,694,249 B1 | 2/2004 | Anderson | 701/120 |
| 6,744,382 B1 | 6/2004 | Lapis | 340/971 |
| 6,751,532 B2 | 6/2004 | Inokuchi | 701/14 |
| 6,754,585 B2 * | 6/2004 | Root et al. | 702/3 |
| 6,791,472 B1 * | 9/2004 | Hoffberg | 340/905 |
| 6,862,501 B2 * | 3/2005 | He | 701/3 |
| 6,937,937 B1 * | 8/2005 | Manfred et al. | 702/2 |
| 2003/0073406 A1 * | 4/2003 | Benjamin et al. | 455/41 |

OTHER PUBLICATIONS

"Theater-Wide Reference Information Management", Berning, S.; Howe, P.; Jenkins, T. Aerospace and Electronics Conference, 1996. NAECON 1996., Proceedings of the IEEE 1996 National vol. 1, May 20-23, 1996 Ps:122-128.*

* cited by examiner

Primary Examiner—John B. Sotomayor
(74) Attorney, Agent, or Firm—Nathan O. Jensen; Kyle Eppele

(57) ABSTRACT

An airborne network system (ANS) on a member aircraft receives incoming geo-referenced atmospheric data regarding atmospheric conditions from other member aircraft and can re-transmit the data to other members. An air data system senses local pressure and temperature conditions. A navigation system calculates geo-referenced aircraft position. An inertial data system senses member aircraft attitude, angular rates and accelerations. A data processing system (DPS) generates the member aircraft's perspective of the atmospheric conditions, based on input data from the above-mentioned systems. Network directed DPS output atmospheric data is provided to the ANS to be transmitted to other airborne network systems positioned on other member aircraft. An airborne display system is adapted to receive crew directed DPS output atmospheric data and in response thereto display desired atmospheric forecast conditions. An airborne caution/advisory system receives the crew directed DPS output atmospheric data and alerts the pilot(s) of hazardous flight conditions.

20 Claims, 1 Drawing Sheet

ATMOSPHERIC DATA AGGREGATION AND FORECASTING SYSTEM

BACKGROUND OF THE INVENTION

1. Field of the Invention

The present invention relates to turbulence detection systems and more particularly to an atmospheric data aggregation and forecasting system that utilizes a network of member aircraft for collecting and sharing data to be used as inputs to atmospheric and turbulence forecasting tools and methods.

2. Description of the Related Art

In today's environment, the flight crew has limited access to tactically relevant atmospheric information needed to improve efficiency and safety of flight operations. Most of the information that is available is strategic in nature (long range forecasts covering large areas). This approach tends to be overly restrictive and conservative due the dynamic behavior of the atmosphere. The flight crew also has access to turbulence reports from other aircraft that have been reported to the air traffic control system. At the other extreme are turbulence and windshear warning systems that literally provide last second warnings.

The focus of current solution strategies involves the following:

1) The aircraft provides limited wind and turbulence reports to an operations center by voice or ACARS (primarily winds aloft information).
2) This information is collected and analyzed by the operations center.
3) Updated wind and turbulence information is provided to the Flight Crew (by voice communications or by ACARS). However, the bandwidth of current communications systems is limited. Furthermore, communications costs are high and the time lag for data reporting, data analysis, and weather forecasting does not always allow timely information to be provided to aircraft already enroute.

New communications channels are being introduced into service that provide higher bandwidth at potentially lower costs. This allows more weather data to be transmitted between the aircraft to the operations center. More complete or detailed data from airborne sensors can be collected and transmitted to the operations center. More complex weather information can be provided in return to the aircraft. These higher bandwidth channels support the delivery of graphical weather information to the aircraft in addition to, or instead of, the current text-based weather data.

Maritime Applications have similar limitations. Limited weather information is gathered from buoys, ships, and platforms. The weather information is collected and analyzed at an operations center. Updated weather conditions and forecasts are provided to remote users via radio systems or satellite communications.

Remote Land-Based Applications have similar limitations. Updated weather conditions and forecasts are provided to remote users via radio systems or satellite communications.

U.S. Pat. No. 6,043,756, issued to Bateman et al, entitled "Aircraft Weather Information System," discloses a system and method for downlinking weather data, generated by existing weather and data sensors, to a ground station. The ground station utilizes data from multiple aircraft to form refined weather information, and uplinks the refined weather information to the aircraft. The refined weather information is stored at the aircraft and picture generating equipment, such as an existing onboard ground proximity terrain picture and symbol generator, generates pictorial information depicting weather. The pictorial information is displayed, for example by an existing EFIS or weather radar display, in the form of polygons.

U.S. Pat. No. 6,501,392, issued to Gremmert et al, entitled "Aircraft Weather Information System" is related to U.S. Pat. No. 6,043,756, discussed above. The '392 patent discloses a similar system and method.

U.S. Pat. No. 6,667,710, issued to Cornell et al, entitled "3-D Weather Buffer Display System", discloses a system, method, and computer program product for generating various weather radar images. A weather radar display system includes a database, a display, and a display processor coupled to the database and the display. The display processor includes a first component configured to store radar return data in a three-dimensional buffer in the database based on aircraft position information, a second component configured to extract at least a portion of the data stored in the three-dimensional buffer based on aircraft position information, and a third component configured to generate an image of the extracted return data for presentation on the display.

U.S. Pat. No. 6,751,532, issued to H. Inokuchi, entitled "Wind Turbulence Prediction System" discloses a wind turbulence prediction system for an aircraft that measures the speed of remote three-dimensional air flow by mounting a laser wind speed indicator utilizing the Doppler effect on an aircraft, irradiating laser light while scanning same in a cone shape, and then receiving scattered light from wind turbulence regions forward of the aircraft body in flight. The system expresses wind turbulence by breakdown of the same into turbulent flow strength and average wind.

U.S. Ser. No. 11/014,118, still pending entitled, "Weather Data Aggregation and Display System For Airborne Network of Member Aircraft," filed concurrently herewith, by co-applicants, P. McCusker and E. Anderson, and assigned to the present assignee (bearing Rockwell Collins Internal Docket No. 04CR173/KE), discloses a weather data aggregation and display system for displaying weather radar information to a pilot of a member aircraft of an airborne network of member aircraft. The weather data aggregation and display system includes an airborne network system (ANS) positioned on the member aircraft adapted to receive incoming geo-referenced weather data regarding Significant Meteorological Systems (SMS) from associated airborne network systems positioned on other member aircraft. A data processing system (DPS) is coupled to the airborne network system for generating the member aircraft's perspective of the SMS, based on the incoming weather data and the member aircraft's navigation and attitude information. The DPS provides DPS output weather data. An airborne display system (ADS) is positioned on the member aircraft and coupled to the data processing system. The airborne display system is adapted to receive the DPS output weather data and in response thereto display desired weather imagery of the Significant Meteorological Systems. The ANS is adapted to re-transmit the incoming geo-referenced weather data to associated airborne network systems positioned on other member aircraft. This co-filed patent application is incorporated by reference herein in its entirety.

SUMMARY OF THE INVENTION

In a broad aspect, the present invention is an atmospheric data aggregation and forecasting system for providing improved atmospheric forecasts to a pilot of a member aircraft of an airborne network of member aircraft. The weather data aggregation and forecasting system, includes an airborne network system (ANS) positioned on the member aircraft adapted to receive incoming geo-referenced atmospheric data regarding atmospheric conditions from associated airborne network systems positioned on other member aircraft. The ANS is also adapted to re-transmit the incoming geo-referenced atmospheric data to airborne network systems positioned on other member aircraft. An air data system senses local pressure and temperature conditions for providing air data system output data. A navigation system calculates geo-referenced aircraft position. The navigation system provides navigation system output data. An inertial data system (IDS) senses member aircraft attitude, angular rates and accelerations. It provides inertial data system output data. A data processing system (DPS) is coupled to the airborne network system, the air data system, the navigation system and the inertial data system. The DPS generates the member aircraft's perspective of the atmospheric conditions, based on the incoming geo-referenced atmospheric data, the air data system output data, the navigation system output data, and the inertial data system output. The DPS provides crew directed DPS output atmospheric data and network directed DPS output atmospheric data. The network directed DPS output atmospheric data is provided to the ANS to be transmitted to other airborne network systems positioned on other member aircraft. An airborne display system (ADS) is positioned on the member aircraft and coupled to the data processing system (DPS). The airborne display system is adapted to receive the crew directed DPS output atmospheric data and in response thereto display desired atmospheric forecast conditions. An airborne caution/advisory system (AC/AS) is coupled to the DPS and is adapted to receive the crew directed DPS output atmospheric data and in response thereto alert the pilot(s) to forecasts of hazardous flight conditions in the vicinity of the member aircraft and/or its planned route.

Thus, the present invention provides for the aggregation of atmospheric data from multiple airborne and marine platforms via a broadband network to support the creation of enhanced 4-D atmospheric models. The model can be used to generate situation awareness displays (by the operations center or by the remote users—the airborne or possibly marine platform). The model can be used to detect and track hazardous weather conditions (e.g. turbulence, icing, etc) of specific interest to a given airborne or marine platform.

BRIEF DESCRIPTION OF THE DRAWINGS

The same elements or parts throughout the figures of the drawings are designated by the same reference characters, while equivalent elements bear a prime designation.

DETAILED DESCRIPTION OF THE INVENTION

Figure 1:
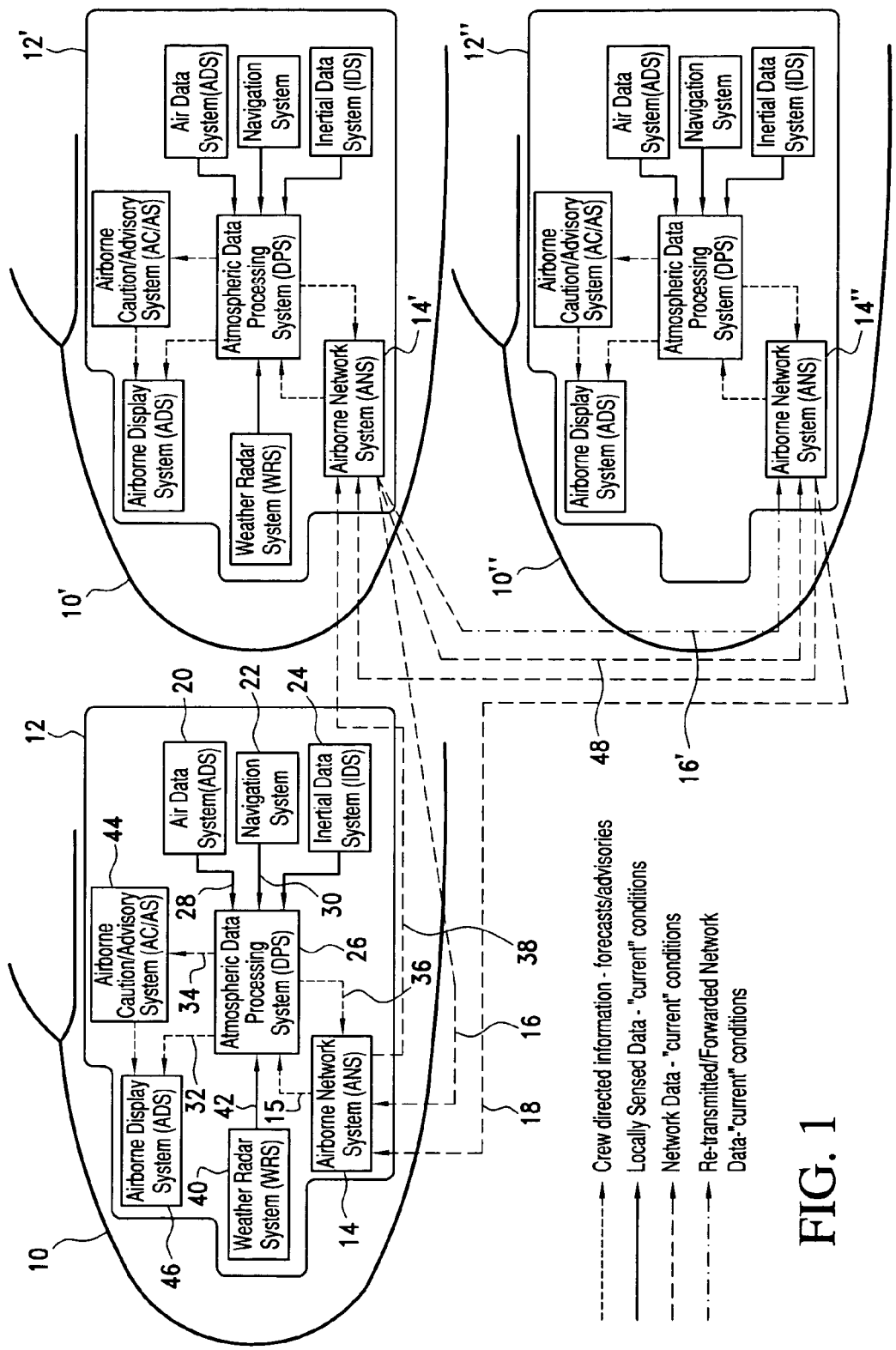
FIG. 1 is a system flow diagram of the atmospheric data aggregation and forecasting system of the present invention.

Referring now to the drawings and the characters of reference marked thereon, FIG. 1 illustrates an airborne network of member aircraft, the aircraft designated generally as 10, 10', and 10'''. Each of the aircraft 10, 10', 10''' is equipped with a respective atmospheric data aggregation and forecast system of the present invention, designated generally as 12, 12', 12'''. It is understood that although this FIGURE shows only three aircraft there may be numerous aircraft in the airborne network.

Each atmospheric data aggregation and forecasting system 12 includes an airborne network system (ANS) 14 positioned on the member aircraft adapted to receive incoming geo-referenced atmospheric data 16, 18 regarding atmospheric conditions from associated airborne network systems 14', 14'' positioned on other member aircraft 12, 12''. As will be explained below in more detail the airborne network systems are also adapted to re-transmit the incoming geo-referenced atmospheric data to airborne network systems positioned on other member aircraft, as shown by line 16'.

The ANS 14 may provide direct aircraft-to-aircraft communications or indirect communications via a ground station or satellite. A high bandwidth ad hoc network may be used.

The system 12 includes an air data system 20 for sensing local pressure and temperature conditions for providing air data system output data. The air data system 20 may be of a commercial type having an electronic output such as distributed by, for example, Rockwell Collins. Examples of Rockwell Collins ADS products include the: ADS-3000, ADS-87A, ADS-1000, ADS-850, ADS-85, and ADS-86. Air data systems are sometimes referred to in the field as Air Data Computers or Air Data Modules. The air data system 20 may be included as part of an integrated system including inertial sensors. Such integrated systems include the ADIRU (Air Data Inertial Reference System) or SAARU (Secondary Air Data and Attitude Reference Unit).

A navigation system 22 calculates geo-referenced aircraft position (e.g. latitude, longitude, altitude). Preferably, the navigation system 22 is a GPS based system such as a Rockwell Collins GLU-9xx or GNLU-9xx multi-mode receiver (MMR). Additional navigation systems include Flight Management Systems which produce similar outputs. In many cases the FMS uses GPS inputs (and other inputs) to produce the navigation solution (position, etc.). Rockwell Collins has several FMS's available for both commercial and government use. For business and regional aircraft Collins FMS products include the FMS-3000, FMS-5000, FMS-6000, and FMS-4200. Several other manufacturers also make GPS and FMS navigation systems.

An inertial data system (IDS) 24 is used for sensing and reporting on member aircraft attitude, angular rates and accelerations. The inertial data system 24 may be one of two general classes of inertial sensors. One class of the inertial data system 24 provides data and does not calculate/derive additional information from the data. Systems 24 of this first class are generally referred to as Attitude and Heading Reference Systems (AHARS). Rockwell Collins manufactured AHARS include AHS-1000 and AHS-3000. These are generally used by business and regional aircraft. A more advanced class of inertial data systems use the same basic sensor set but derives navigation type data from the sensor inputs. These are often referred to by the system acronyms (IRS, AHARS, ADIRU, and SAARU).

An atmospheric data processing system (DPS) 26 is coupled to the airborne network system 14, the air data system 20, the navigation system 22 and the inertial data system 24. The DPS 26 generates the member aircraft's perspective of the atmospheric conditions based on the incoming geo-referenced atmospheric data 16, 18 provided by the ANS 14 as shown by line 15; air data system output data 28; navigation system output data 22; and inertial data system output 24. The DPS 26 provides crew directed DPS output atmospheric data 32, 34 and network directed DPS output atmospheric data 36. The network directed DPS output atmospheric data 36 being provided to the ANS 14 can be transmitted to other airborne network systems positioned on other member aircraft, as shown by line 38. Thus, in summary, the atmospheric DPS 26 uses the data from different network sources to define/refine the initial conditions for the forecasting model and takes local sensor data and makes it available to the network. The DPS 26 may provide ARINC 708, ARINC 661 or next generation ARINC 661 or equivalent data.

A weather rader system (WRS) 40 is preferably included with the atmospheric data aggregation and forecasting system 12 for collecting weather data from the atmosphere in the vicinity of the member aircraft. The WRS 40 transmits weather radar system output data 42 to the DPS 26. Most weather radar systems can collect velocity data and precipitation (humidity) data for air masses ahead of the aircraft. Some weather radar systems can collect temperature data for air masses ahead of the aircraft. Some weather radar systems also provide predictive windshear and turbulence detection for regions ahead of the aircraft. The weather radar system used may be of a type manufactured by present assignee, such as the Collins WXR-2100 MultiScan™ Radar.

The airborne caution/advisory System (AC/AS) 44 can either be an independent system (as shown in FIG. 1) or may be a part of a larger system, i.e. part of the airborne display system (ADS) 46. Caution/Advisory Systems (also referred to as Crew Alerting Systems) are designed to provide crew annunciations (messages) in a prioritized manner based on the level of importance. These systems receive and analyze inputs from a variety of aircraft systems and have a hierarchy of messages/alerts for prioritizing the outputs to the crew.

The AC/AS 44 may be commercially available. One example of an AC/AS is the Collins EICAS-700 Engine Indication and Crew Alert System. The EICAS-700 is a solid-state, color display system used to display engine data and caution and warning messages for accurate and rapid interpretation by the flight crew. Primary and secondary engine parameters, aircraft systems' status and maintenance data may all be selected or displayed automatically as necessary.

More modern systems like the Collins Integrated Display System (IDS-7000) or Large Format Display System (LFDS) for the Boeing 767-400 integrate the Crew alert system (CAS) (or EICAS) System functions into the overall display system. For the 777 (and more integrated systems like the 7E7) the AC/AS functions are hosted on the avionics platform—which in these cases is a modular avionics cabinet which hosts several functions/applications.

Modern aircraft have highly complex integrated aircraft systems. Those systems often generate more data than a flight crew can consume, creating a need for distillation into the information needed to operate and maintain the aircraft. The Collins EIS/EICAS provides real-time monitoring and diagnostics of major aircraft systems.

The EIS-3000 Engine Indication System is designed to provide engine indication in an integrated flight deck. The information displayed includes torque, interstage turbine temperature, high and low pressure gas generator RPM, fuel flow, oil temperature, oil pressure and any other primary system indication that requires full-time display for aircraft operation.

The EICAS-5000 Engine Indication and Crew Alerting System (CAS) fully integrates engine indication, crew alerting, synoptic display of aircraft systems and processing of maintenance data into the flight deck. The crew alerting feature provides CAS messaging, flight deck lamp control and aural alerting. Aural alerts can include voice and synthesized tones.

Certain output signals 32 from the DPS 26 may be sent directly to the ADS 46. The DPS 26 may generate a graphical representation of the forecast (e.g. areas of turbulence) that can be displayed on the ADS 46. The graphical representation may be as defined in ARINC 708, ARINC 661, a next generation of ARINC 661 or equivalent, or any future suitable aviation standard. The composite weather graphics may also be defined in standardized commercial markup languages such as Hyper Text Markup Language (HTML), Standard Generalized Markup Language (SGML), eXtensible Markup Language (XML) or future standards.

Each member aircraft is essentially a communications node that can not only transmit and receive local data but re-transmit any received data to any other node (member). Thus, even if there is no direct RF path between members any communications node in the network can re-transmit any received data.

Although these communications nodes have been discussed with reference to aircraft there may be terrestrial nodes, space-based nodes, or maritime nodes. Oceanic data may include, for example, temperature, wave heights, and currents.

Although the present invention has been discussed with respect to the utilization of a weather radar system other types of predictive windshear detection systems may be utilized. Such other types of predictive windshear detection systems may include, for example, a forward looking infrared radar (FLIR) or millimeter wave radar (MMWR). In some instances an aircraft may not include a predictive windshear detection system, such as the aircraft labeled 10".

In operation, in which there is no data forwarding, aircraft 10" receives data from only member aircraft 10', as indicated by arrow 48. Member aircraft 10" cannot receive data direct from member aircraft 10 (i.e. it is out of network range) so it has only partial data 48 based on aircraft 10'.

If there is data forwarding, aircraft 10" receives data from both aircraft 10, 10', as indicated by arrows 48 and 16'. Data 16' is re-transmitted/forwarded network data from member aircraft 10. There is some additional latency in the data from member aircraft 10 but the data from both sources is available.

Other embodiments and configurations may be devised without departing from the spirit of the invention and the scope of the appended claims.

What is claimed is:

1. An atmospheric data aggregation and forecasting system for providing improved atmospheric forecasts to a pilot of a member aircraft of an airborne network of member aircraft, said weather data aggregation and forecasting system, comprising:

an airborne network system (ANS) positioned on the member aircraft adapted to receive incoming geo-referenced atmospheric data regarding atmospheric conditions from associated airborne network systems positioned on other member aircraft, said ANS also being adapted to re-transmit said incoming geo-referenced atmospheric data to airborne network systems positioned on other member aircraft;

an air data system for sensing local pressure and temperature conditions for providing air data system output data;

a navigation system for calculating geo-referenced aircraft position, said navigation system providing navigation system output data;

an inertial data system (IDS) for sensing member aircraft attitude, angular rates and accelerations, said IDS providing inertial data system output data;

a data processing system (DPS) coupled to said airborne network system, said air data system, said navigation system and said inertial data system, said DPS for generating the member aircraft's perspective of said atmospheric conditions, based on said incoming geo-referenced atmospheric data, said air data system output data, said navigation system output data, and said inertial data system output, said DPS providing crew directed DPS output atmospheric data and network directed DPS output atmospheric data, said network directed DPS output atmospheric data being provided to said ANS to be transmitted to other airborne network systems positioned on other member aircraft;

an airborne display system (ADS) positioned on the member aircraft and coupled to said data processing system (DPS), said airborne display system being adapted to receive said crew directed DPS output atmospheric data and in response thereto display desired atmospheric forecast conditions; and, an airborne caution/advisory system (AC/AS) coupled to said DPS and being adapted to receive said crew directed DPS output atmospheric data and in response thereto alert the pilot(s) to forecasts of hazardous flight conditions in the vicinity of the member aircraft and/or its planned route.

2. The system of claim 1, further comprising:
a weather radar system for collecting weather data from the atmosphere in the vicinity of said member aircraft and transmitting weather radar system output data to said DPS.

3. The system of claim 1, wherein said AC/AS receives crew directed DPS output atmospheric data and analyses said data to provide a desired caution/advisory output signal which is received by said ADS and utilized by said ADS.

4. The system of claim 1, wherein said AC/AS is a separate unit from said ADS.

5. The system of claim 1, wherein said AC/AS is housed within said ADS.

6. The system of claim 1, wherein said DPS provides ARINC 708 interface data and aircraft position and altitude data to said ADS.

7. The system of claim 1, wherein said DPS provides ARINC 661 interface data and aircraft position and altitude data to said ADS.

8. The system of claim 1, wherein said airborne network system (ANS) comprises a direct aircraft-to-aircraft communications network.

9. The system of claim 1, wherein said airborne network system (ANS) comprises a high bandwidth ad hoc network.

10. The system of claim 1, wherein said airborne network system (ANS) comprises an indirect aircraft-to-aircraft communications network utilizing ground-based communications stations.

11. The system of claim 1, wherein said airborne network system (ANS) utilizes an indirect aircraft-to-aircraft communications network utilizing a satellite-based network.

12. An atmospheric data aggregation and forecasting system for providing improved atmospheric forecasts to a pilot of a member aircraft of an airborne network of member aircraft, said weather data aggregation and forecasting system, comprising:

an airborne network system (ANS) positioned on the member aircraft adapted to receive incoming geo-referenced atmospheric data regarding atmospheric conditions from associated airborne network systems positioned on other member aircraft, said ANS also being adapted to re-transmit said incoming geo-referenced atmospheric data to airborne network systems positioned on other member aircraft;

an air data system for sensing local pressure and temperature conditions for providing air data system output data;

a navigation system for calculating geo-referenced aircraft position, said navigation system providing navigation system output data;

an inertial data system (IDS) for sensing member aircraft attitude, angular rates and accelerations, said IDS providing inertial data system output data;

a data processing system (DPS) coupled to said airborne network system, said air data system, said navigation system and said inertial data system, said DPS for generating the member aircraft's perspective of said atmospheric conditions, based on said incoming geo-referenced atmospheric data, said air data system output data, said navigation system output data, and said inertial data system output, said DPS providing crew directed DPS output atmospheric data and network directed DPS output atmospheric data, said network directed DPS output atmospheric data being provided to said ANS to be transmitted to other airborne network systems positioned on other member aircraft;

a predictive windshear detection system for collecting weather data from the atmosphere in the vicinity of said member aircraft and transmitting predictive windshear detection system output data to said DPS;

an airborne display system (ADS) positioned on the member aircraft and coupled to said data processing system (DPS), said airborne display system being adapted to receive said crew directed DPS output atmospheric data and in response thereto display desired atmospheric forecast conditions; and, an airborne caution/advisory system (AC/AS) coupled to said DPS and being adapted to receive said crew directed DPS output atmospheric data and in response thereto alert the pilot(s) to forecasts of hazardous flight conditions in the vicinity of the member aircraft and/or its planned route.

13. The system of claim 12, wherein said predictive windshear detection system, comprises a weather radar system.

14. The system of claim 12, wherein said predictive windshear detection system, comprises a forward looking infrared radar (FLIR).

15. The system of claim 12, wherein said predictive windshear detection system, comprises a millimeter wave radar (MMWR).

16. The system of claim 12, wherein said AC/AS receives crew directed DPS output atmospheric data and analyses said data to provide a desired caution/advisory output signal which is received by said ADS and utilized by said ADS.

17. The system of claim 12, wherein said AC/AS is a separate unit from said ADS.

18. The system of claim 12, wherein said AC/AS is housed within said ADS.

19. An airborne network of member aircraft capable of communicating with each other for aggregating data and providing atmospheric forecasting, each member aircraft in said airborne network having an atmospheric data aggregation and forecasting system for providing improved atmospheric forecasts to a pilot of a member aircraft, each said weather data aggregation and display system, comprising:

an airborne network system (ANS) positioned on the member aircraft adapted to receive incoming geo-referenced atmospheric data regarding atmospheric conditions from associated airborne network systems positioned on other member aircraft, said ANS also being adapted to re-transmit said incoming geo-referenced atmospheric data to airborne network systems positioned on other member aircraft;

an air data system for sensing local pressure and temperature conditions for providing air data system output data;

a navigation system for calculating geo-referenced aircraft position, said navigation system providing navigation system output data;

an inertial data system (IDS) for sensing member aircraft attitude, angular rates and accelerations, said IDS providing inertial data system output data;

a data processing system (DPS) coupled to said airborne network system, said air data system, said navigation system and said inertial data system, said DPS for generating the member aircraft's perspective of said atmospheric conditions, based on said incoming geo-referenced atmospheric data, said air data system output data, said navigation system output data, and said inertial data system output, said DPS providing crew directed DPS output atmospheric data and network directed DPS output atmospheric data, said network directed DPS output atmospheric data being provided to said ANS to be transmitted to other airborne network systems positioned on other member aircraft;

an airborne display system (ADS) positioned on the member aircraft and coupled to said data processing system (DPS), said airborne display system being adapted to receive said crew directed DPS output atmospheric data and in response thereto display desired atmospheric forecast conditions; and, an airborne caution/advisory system (AC/AS) coupled to said DPS and being adapted to receive said crew directed DPS output atmospheric data and in response thereto alert the pilot(s) to forecasts of hazardous flight conditions in the vicinity of the member aircraft and/or its planned route.

20. The airborne network of claim 19, wherein each said weather data aggregation and display system further comprises:

a weather radar system for collecting weather data from the atmosphere in the vicinity of said member aircraft and transmitting weather radar system output data to said DPS.

* * * * *